Figure 1:
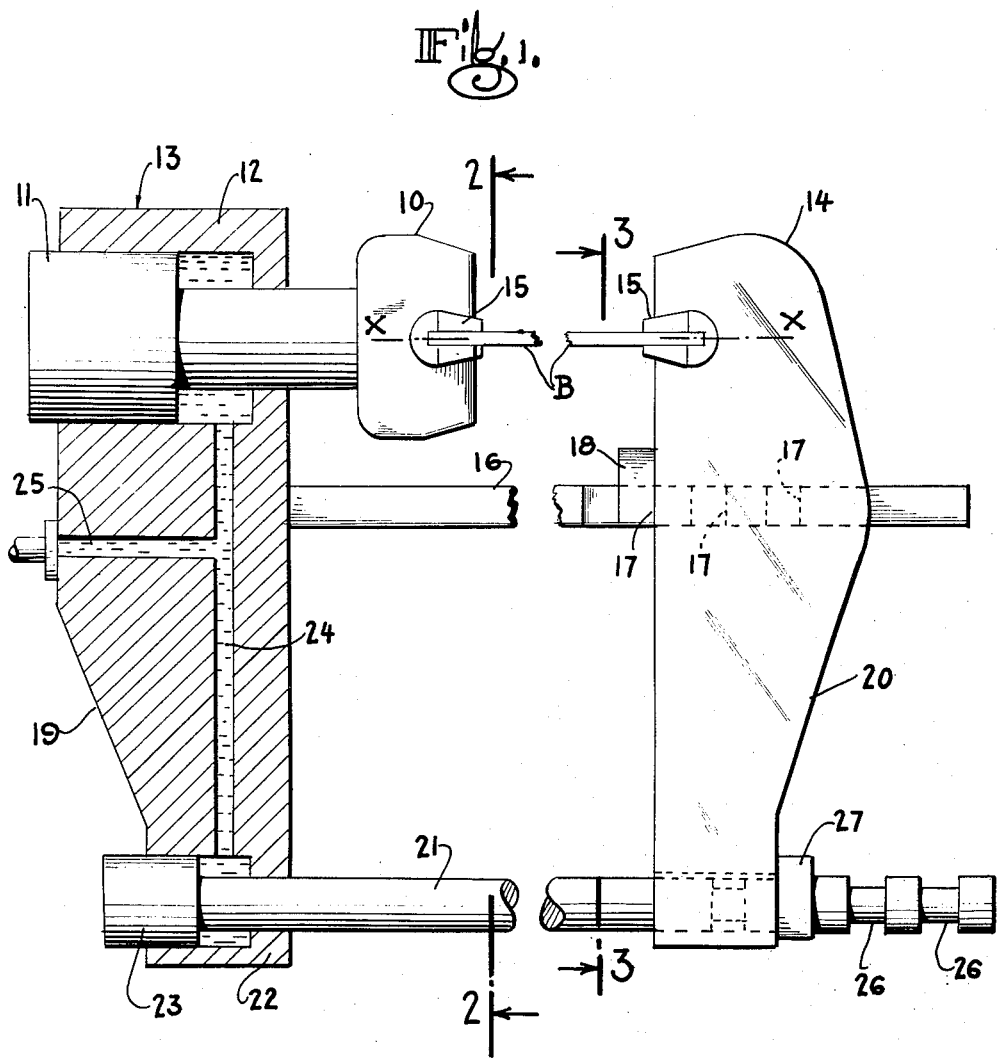

Sept. 30, 1958     F. S. SALTER     2,854,053
HYDRAULICALLY OPERATED FORCE APPLYING MACHINE
HAVING MEANS FOR BALANCING INDUCED
BENDING MOMENTS IN THE MACHINE
Filed Aug. 20, 1956     3 Sheets-Sheet 1

INVENTOR
Frank Sidney Salter

Sept. 30, 1958  F. S. SALTER  2,854,053
HYDRAULICALLY OPERATED FORCE APPLYING MACHINE
HAVING MEANS FOR BALANCING INDUCED
BENDING MOMENTS IN THE MACHINE
Filed Aug. 20, 1956  3 Sheets-Sheet 2

INVENTOR
Frank Sidney Salter
BY
ATTORNEYS

Sept. 30, 1958 F. S. SALTER 2,854,053
HYDRAULICALLY OPERATED FORCE APPLYING MACHINE
HAVING MEANS FOR BALANCING INDUCED
BENDING MOMENTS IN THE MACHINE
Filed Aug. 20, 1956 3 Sheets-Sheet 3
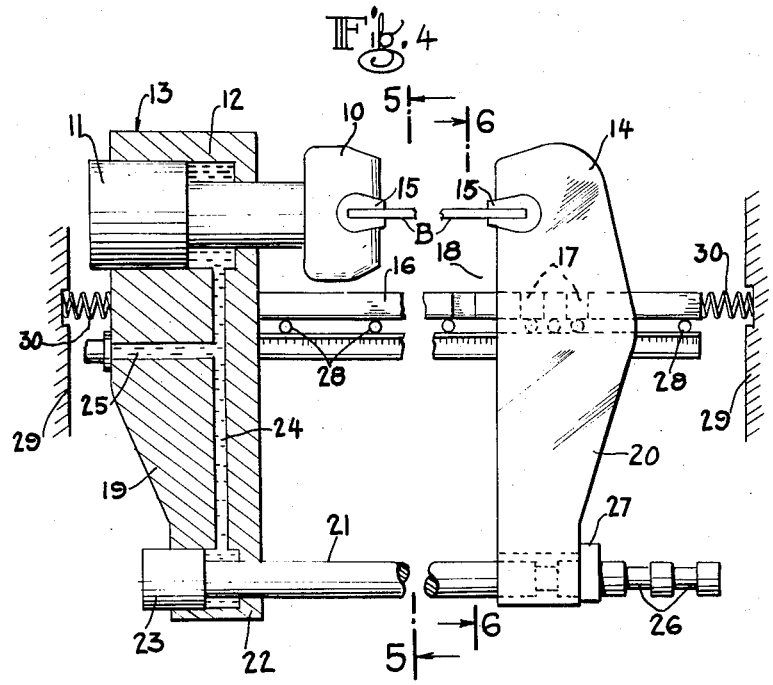
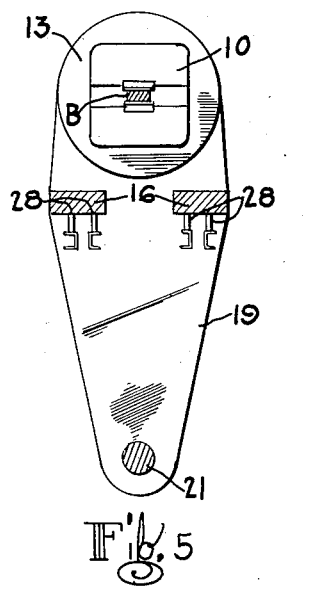
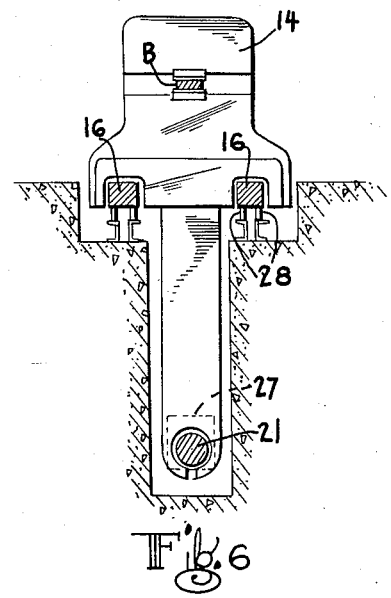
INVENTOR
Frank Sidney Salter
BY
ATTORNEYS United States Patent Office 2,854,053
Patented Sept. 30, 1958

2,854,053

HYDRAULICALLY OPERATED FORCE APPLYING MACHINE HAVING MEANS FOR BALANCING INDUCED BENDING MOMENTS IN THE MACHINE

Frank S. Salter, Parkstone, England, assignor to The Loewy Engineering Company Limited, Bournemouth, England, a corporation of Great Britain Application August 20, 1956, Serial No. 605,104

5 Claims. (Cl. 153—35)

This invention relates in its most general aspect to apparatus in which a working force is applied to a metal workpiece whilst the latter is held against displacement in the direction in which this force is applied, the force being used for a variety of purposes in the different categories of machines to which the present invention relates. One kind of machine in which the invention can be used with advantage is a horizontal stretching machine for metal workpieces of substantially uniform cross-section, such as extruded bars or sections, or rolled bars or sheets. Another category of machines is hydraulic pipe testing or pipe expanding machines. In the case of stretching machines, the operating force is a pulling force, and in the case of pipe testing or pipe expanding machines, a thrust force.

The means for holding the workpieces against displacement provided in these kinds of machines usually comprise two spaced-apart gripperheads which in the working space determined therebetween firmly engage at opposite ends a workpiece to be subjected to the working force. One of these gripperheads is connected to hydraulic power means which supply the operating or working force, while the other gripperhead is usually mounted on a carriage so as to be displaceable relative to the first gripperhead for the purpose of adjusting the distance between both gripperheads in accordance with the length of the individual workpiece under treatment, the carriage being adapted to be firmly locked against displacement at a predetermined distance from the first gripperhead. The stationary part of the hydraulic power means is generally mounted on a frame which extends along the entire length of the machine and which carries the guideways for the carriage, means being provided for locking said carriage firmly to the uppermost part of the frame at a series of predetermined points. With this design, the reaction of the operating force is transmitted to the longitudinal top members of the frame structure of the machine, and said members may or may not include separate tie-rods extending from the stationary part of the hydraulic power means to the opposite end of the frame where the movable gripperhead and the carriage for it are disposed.

Frequently, the frame of the machine was so mounted on its foundation that it could move horizontally by a short distance against the pressure of springs provided for the purpose of absorbing shocks due to accidental rupture of a workpiece.

As the workpieces to be handled in these machines are usually of great length, the most expedient way for moving them into and out of the working space of the machine between the gripperheads is by broad-side transfer. It is therefore desirable to keep the working space above floor level, at least at one side of the machine, and preferably at both sides, free from any obstructions which would impede the broad-side movement of a workpiece into and out of the machine. Consequently, the top members of the frame structure which had to take the reaction of the operating force, have to be arranged at a level well below the horizontal plane containing the axis along which the operating force was applied to the workpiece. The results of this are bending moments which tend to deflect the uppermost part of the frame structure at both their ends.

As the operating force in these machines was usually in the order of several hundred tons or more, the deflections which the frame structure underwent were likely to be considerable. One way of reducing them was to strengthen the cross-sections of those parts of the frame subjected to bending stresses. This was apt to lead to heavy and expensive designs. In the case of those machines in which the frame was horizontally movable relative to its foundation, increase of the weight of the frame was further undesirable because it increased the shock loads on the springs.

The various contradictory requirements which a machine of the type under consideration had to fulfill were, in practice, difficult to reconcile with each other, and they limited the capacity and size up to which these machines could be conveniently built and operated.

It is a first object of the present invention to provide a machine of the kind referred to in which the horizontal top members of the frame structure are so arranged that they do not impede in any way the broad-side transfer of the workpieces into and out of the working space of the machine.

In another aspect, it is an object of the invention to provide a machine of the kind referred to in which bending moments resulting from the operating force are cancelled out, so that those frame members which take up the reaction to the operating force can be arranged at any distance below the horizontal plane which contains the axis of the operating force.

It is a still further object of the invention to provide a machine of the type referred to in which the frame structure can be made comparatively light.

According to the present invention, there are provided in a machine of the type referred to means for compensating the bending moments arising from the operating force, these compensating means comprising a bar horizontal member arranged below the top members of the frame structure of the machine and extending parallel thereto, and means for producing in said bar member a compensating force simultaneously with said operating force and in the same direction as the latter, said bar member being connected at its ends to the ends of said top members.

In this arrangement, the compensating force will subject the top members of the frame structure to additional bending moments whose direction is opposite to those bending moments produced in said members by the operating force itself. These two sets of bending moments will, therefore, counteract each other. By determining the compensating force so that the ratio of this force to the operating force is inversely proportional to the ratio of their respective vertical distances from the horizontal plane containing the reaction to the operating force, one set of these bending moments will be equal but opposite to the other set of bending moments, and the two sets will, therefore, cancel each other out.

The uppermost part of the frame will then remain free from any bending stresses, and deflections will be entirely avoided, and this irrespective of the vertical distance between said members and the horizontal plane containing the axis of the operating force. This makes it possible to arrange said members at any desired level, which may be floor level or below, so they will not obstruct the broadside movement of a workpiece into the working space between the gripperheads.

In a preferred embodiment of the invention, the compensating force is supplied by separate hydraulic power means which is built into one end of the bar member and which acts upon the latter in such a direction as to set up a force in the same direction as the working force. Preferably, this hydraulic power means is directly connected to the hydraulic power means which supply the operating force of the machine. In this way, the simultaneous application of both forces is ensured.

The connections between the stationary part of the main hydraulic power means and of the carriage or second gripperhead to the top members of the frame structure may have downward extensions to which the bar compensating member is connected, the afore-mentioned separate hydraulic power means acting on the bar member being built into one of said extensions.

In one form, the frame structure of a machine according to the invention will comprise top members taking up the reaction of the operating force and serving at the same time as guideways for the movable gripperheads, a bar member arranged below the top members and vertically spaced-apart from the latter, and extensions of the stationary part of the main hydraulic power means and of the movable gripperhead, said bar member being supported in said extensions and being subjected to a force in the same direction as the operating force acts on the workpiece. When the operating force is a pulling force, the bar member is a tie member in a stretching machine. When the operating force is a thrust, the bar member is a strut member in a pipe testing or expanding machine. Thus, the term "bar member" as used in this application is intended to cover bar operating as either tie members or strut members.

An embodiment of the invention will now be described by way of example with reference to the accompanying drawings representing a hydraulic stretching machine for metal workpieces.

Figure 2:
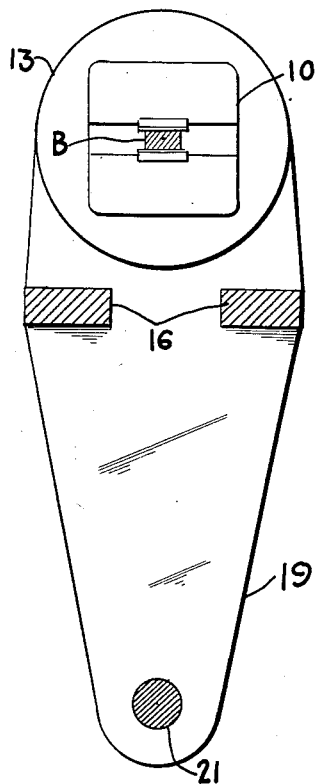
Figure 3:
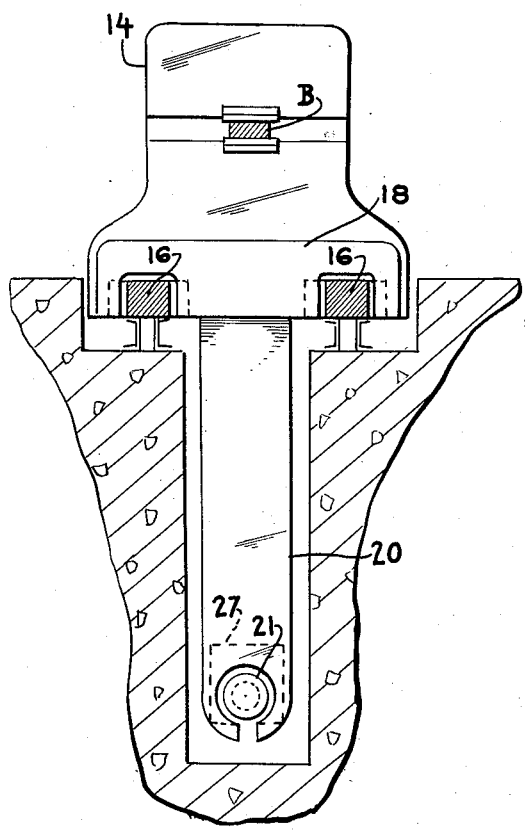

Fig. 1 is a side view of the machine,
Fig. 2 is a section along the line 2—2 of Fig. 1,
Fig. 3 is a section along the line 3—3 of Fig. 1,
Fig. 4 is a modified embodiment of the machine,
Fig. 5 is a section on the line 5—5 of Fig. 4, and
Fig. 6 is a section on the line 6—6 of Fig. 4.

The stretching machine shown in the drawings comprises a first gripperhead 10 which is attached to the ram 11, the latter being displaceable in a cylinder 12. The ram 11 and cylinder 12 form together the main hydraulic power means 13. Arranged opposite the first gripperhead 10 is a second gripperhead 14, the latter being movable by means not shown in a direction towards and away from the first gripperhead. Both gripperheads have pairs of jaws 15 between which a workpiece B to be stretched can be firmly held.

The frame structure of the machine comprises horizontal and longitudinally extending top members 16 which form guideways for the movement of the second gripperhead 14. The members 16 are provided at spaced-apart points with indentations 17 which can be entered by a crossbar 18, thereby locking the gripperhead 14 against movement toward the gripperhead 10. Alternatively, the gripperhead 14 can be mounted on a carriage with trolley wheels displaceable along the top members 16, hooks being provided on the gripperhead which can drop into notches formed in the top members 16 (see Fig. 4).

The cylinder 12 and the gripperhead 14 have tapered downward extensions, or tails, 19 and 20 respectively which support at their lowermost ends a bar member 21. The frame structure of the machine is thus formed by the top members 16, the tails 19 and 20 and the bar member 21, it being understood that the top members 16 are secured in a suitable manner to the tail 19.

The tail 19 is provided at its lowermost end with hydraulic compensating means comprising a cylinder 22 and a ram 23 displaceable therein, the ram being attached to the bar member 21. The spaces inside the cylinders 12 and 22 are connected to each other by a fluid passageway 24 in the tail 19 which, in turn, is connected through a passageway 25 to an outward source of pressure-fluid supply.

The opposite end of the member 21 which is supported in the tail 20 is formed with a series of indentations 26 corresponding to the indentations 17 for the insertion of a substantially U-shaped locking piece 27 at the side of the tail 20 remote from the tail 19. In this way, the member 21 is firmly locked relative to the tail 20.

The machine is operated in that manner that a workpiece B is first introduced between the clamping jaws 15, after the gripperhead 14 has been positioned at the required distance from the gripperhead 10, and locked in position by means of the parts 18 and 27. An operating or working force is then applied to the workpiece B for effecting the stretching of the latter through the main hydraulic power means 13, which tends to move the gripperhead 10 away from the gripperhead 14. This results in a pulling force being produced in the workpiece B, whose reaction, a compressive force, is taken up by the top members 16. Since the top members are below the horizontal plane X—X which contains the axis of the operating force, bending moments are produced in the top members 16 which would result in the ends of these top members being deflected in an upward direction.

In order to avoid these deflections and to cancel out the bending moments, the compensating means, comprising the bar member 21 and cylinder 22 with the ram 23, are provided. The cylinder 22 will be filled with pressure-fluid through the common passageways 24, 25 at the same time as the cylinder 12. The ram 23 will thereby be subjected to a force which will tend to pull the member 21 in a direction away from the tail 20.

The force produced in the member 21 is, therefore, in the same direction as the operating force applied to the workpiece B. This compensating force will also produce bending moments acting on the top members 16, but in a direction opposite to that of the bending moments produced by the operating force. By determining the compensating force so that the ratio of the operating force is inversely proportional to the ratio of the distances of the workpiece B and the member 21 respectively from the top members 16, the two sets of bending moments will be equal but opposite, and these two sets will therefore cancel each other out, so that the top members 16 will remain free from any bending stresses, and no deflections will occur.

It will be clear from the foregoing that the size of the hydraulic cylinder 22 and ram 23 depends on the distance of the bar member 21 and the top members 16 from the axis of the operating force, and that the larger that distance, the smaller the size. Since the top members 16 are only subjected to compressive stresses, and not to any bending, they can be made relatively light, as can be seen from the drawings.

A very important advantage of the invention consists in that the working space between the gripperheads 10 and 14 can remain free from any obstructions at either side thereof, as shown in Figs. 2 and 3. This is rendered possible through the elimination of any bending stresses in the top members 16, which permits the arrangement of the top members at any desired level, for instance, at floor level, or still further below.

In an alternative embodiment of the invention, see Figs. 4, 5 and 6, the entire frame structure 11, 12, 13, 14, 16 can be arranged on wheels 28 which are displaceable in a horizontal direction on the foundations of the machine against the pressure of springs 30—30 for the purpose of absorbing shocks due to any accidental rupture of a workpiece. The machine according to the invention has the advantage that it is of comparatively light design, so that the shocks due to impact of the frame structure on the springs are lessened.

The invention is described in the foregoing with reference to a hydraulic stretching machine, but it is understood that it is equally applicable to other machines in which an operating force is applied to a workpiece while the latter is held against displacement in the direction in which the force is applied, such as pipe testing or pipe expanding machines, shown in Fig. 4.

What is claimed is:

1. In an apparatus having first hydraulic power means for applying a working force to a workpiece and having a horizontal frame structure provided with an uppermost frame member having guideway means and spaced below the axis of the working force whereby said frame structure is subjected to bending moments arising from the working force applied to said workpiece, said frame structure including a cylinder housing and spaced gripperheads, said first hydraulic power means being provided in said cylinder housing, said uppermost frame member being carried by said cylinder housing, said spaced gripperheads securing the workpiece substantially horizontally therebetween and determining the working space, a first of said gripperheads being carried by said cylinder housing and operatively driven by said hydraulic power means to move relative to said cylinder housing and apply the working force to said workpiece, the other of said gripperheads being slidably mounted on said guideway means for rectilinear motion relative to said first gripperhead to an adjusted position determined by the length of said workpiece and lockable on said guideway means in said adjusted position to thereby hold one end of said workpiece fixed while the working force is being applied to said workpiece; and, compensating means for balancing said bending moments, said compensating means comprising, a bar member extending below said uppermost frame member and having its axis parallel to the axis of the working force and locked at one end of said other gripperhead while the working force is being applied to said workpiece, and second power means provided on said cylinder housing for applying to said bar member simultaneously with the application of the working force to said workpiece a compensating force subjecting said frame structure to bending moments of direction opposite to the direction of the bending moments arising from the working force applied to said workpiece, whereby said frame structure is free from bending stresses to thereby avoid deflections thereof.

2. In an apparatus constructed according to claim 1, said frame structure further including an extension provided on said cylinder housing, said second power means being provided on said extension to connect said bar member to said extension whereby the axis of the compensating force is spaced from the axis of the working force further than said uppermost frame member is spaced from said last mentioned plane with the axis of said compensating force below said uppermost member to permit free broadside movement of said workpiece in the working space between said gripperheads before securing said workpiece to said gripperheads.

3. In an apparatus constructed according to claim 1, said bar member being provided with adjusting means permitting movement of said other gripperhead relative to said bar member to an adjusted position determined by the length of said workpiece and with locking means for securing said other gripperhead to said bar member in said adjusted position.

4. In an apparatus constructed according to claim 1, said second power means consisting of further hydraulic power means between said cylinder housing and said bar member and applying the compensating force in the identical direction with the direction in which the working force is applied.

5. In an apparatus constructed according to claim 4, said further hydraulic power means being directly connected to said first mentioned hydraulic power means applying the working force to said workpiece and exerting a compensating force proportional to the working force.

References Cited in the file of this patent

UNITED STATES PATENTS

| 404,200 | Jump | May 28, 1889 |
| 1,583,296 | Laussucq | May 4, 1926 |
| 1,865,070 | Amsler | June 28, 1932 |
| 2,296,051 | Pocock | Sept. 15, 1942 |
| 2,580,078 | Denison | Dec. 25, 1951 |

FOREIGN PATENTS

| 551,722 | Great Britain | Mar. 8, 1943 |
| 889,776 | France | Oct. 11, 1943 |

UNITED STATES PATENT OFFICE
CERTIFICATE OF CORRECTION

Patent No. 2,854,053                        September 30, 1958

Frank S. Salter

It is hereby certified that error appears in the printed specification of the above numbered patent requiring correction and that the said Letters Patent should read as corrected below.

Column 3, line 2, after "force", first occurrence, insert -- in that member --.

Signed and sealed this 12th day of May 1959.

(SEAL)
Attest:

KARL H. AXLINE
Attesting Officer

ROBERT C. WATSON
Commissioner of Patents